(12) United States Patent
Wang et al.

(10) Patent No.: US 8,396,609 B2
(45) Date of Patent: Mar. 12, 2013

(54) CONTROL OF CELLS, MODULES AND A PACK COMPRISED OF HYBRIDIZED ELECTROCHEMISTRIES

(75) Inventors: Chia Wei Wang, Ypsilanti, MI (US); Ann Marie Sastry, Ann Arbor, MI (US); Fabio Albano, Ann Arbor, MI (US)

(73) Assignee: Sakti3, Inc., Ann Arbor, MI (US)

( * ) Notice: Subject to any disclaimer, the term of this patent is extended or adjusted under 35 U.S.C. 154(b) by 691 days.

(21) Appl. No.: 12/614,192

(22) Filed: Nov. 6, 2009

(65) Prior Publication Data

US 2010/0138072 A1 Jun. 3, 2010

Related U.S. Application Data (60) Provisional application No. 61/112,716, filed on Nov. 7, 2008.

(51) Int. Cl.
*G05D 11/00* (2006.01)

(52) U.S. Cl. ............... 700/298; 429/9; 429/432

(58) Field of Classification Search ........... 429/9, 13, 429/32, 432; 700/298
See application file for complete search history.

(56) References Cited

U.S. PATENT DOCUMENTS

| | | | |
|---|---|---|---|
| 2003/0054217 A1* | 3/2003 | Faris | 429/27 |
| 2003/0207156 A1* | 11/2003 | Ovshinsky et al. | 429/9 |
| 2004/0065489 A1* | 4/2004 | Aberle et al. | 180/65.1 |
| 2004/0126635 A1* | 7/2004 | Pearson | 429/23 |
| 2004/0175598 A1* | 9/2004 | Bliven et al. | 429/12 |
| 2005/0249988 A1* | 11/2005 | Pearson | 429/13 |
| 2006/0102397 A1* | 5/2006 | Buck et al. | 180/65.3 |
| 2006/0172162 A1* | 8/2006 | Pearson | 429/22 |
| 2006/0194082 A1* | 8/2006 | Tucker et al. | 429/9 |
| 2007/0092763 A1* | 4/2007 | Ouchi | 429/9 |
| 2007/0287043 A1* | 12/2007 | Marsh et al. | 429/23 |
| 2008/0107933 A1* | 5/2008 | Gallagher | 429/17 |

OTHER PUBLICATIONS

International Search Report & Written Opinion of PCT Application No. PCT/US2009/063575, date of mailing Dec. 29, 2009, 12 pages total.

\* cited by examiner

*Primary Examiner* — Mohammad Ali
*Assistant Examiner* — Anthony Whittington
(74) *Attorney, Agent, or Firm* — Richard T. Ogawa; Ogawa P.C.

(57) ABSTRACT

A power management apparatus for a hybridized energy device includes a hybridized energy device including a plurality of units. The units include electrical energy storage and/or gathering cells, in series or in parallel to form a module. A plurality of the modules in series or in parallel form a pack. The power management apparatus also includes a central management apparatus (CMA) interconnecting a plurality of module management apparatus (MMAs) by means of either wired or wireless connections and a plurality of MMAs. Each MMA interconnects with a plurality of unit management apparatuses by means of either wireless or wired communication circuits. The power management apparatus further includes a plurality of units management apparatuses (UMAs), each wired, connected with, or deposited on a unit. Furthermore, the power management apparatus includes a rechargeable battery power source for a CMA, a plurality of MMAs, and a plurality of UMAs.

29 Claims, 10 Drawing Sheets

CONTROL OF CELLS, MODULES AND A PACK COMPRISED OF HYBRIDIZED ELECTROCHEMISTRIES

CROSS-REFERENCES TO RELATED APPLICATIONS

This application claims priority to U.S. Provisional Patent Application No. 61/112,716, filed on Nov. 7, 2008, entitled "Control of cells, modules and pack comprise of hybridized electrochemistries," the disclosure of which is hereby incorporated by reference in its entirety for all purposes.

SUMMARY OF THE INVENTION

According to the present invention, techniques related to control systems for energy devices are provided. More particularly, embodiments of the present invention relate to methods and systems for controlling hybridized energy devices. The methods and systems described herein are also applicable to a variety of energy systems.

According to an embodiment of the present invention, a power management apparatus for a hybridized energy device is provided. The power management apparatus includes a hybridized energy device comprising a plurality of units. The units include electrical energy storage and/or gathering cells, in series or in parallel to form a module. Further, a plurality of the modules are provided in series or in parallel to form a pack. The power management apparatus also includes a central management apparatus (CMA) interconnecting a plurality of module management apparatus (MMAs) by means of either wired or wireless connections. The central management apparatus includes a microcomputer, a power module responsive of distributing the charging currents to each of said modules, a power condition circuit connected across terminals of module management apparatuses and the CMA for providing regulated operating voltages of modules of the associated pack, a plurality of measurement circuits to monitoring a plurality of state parameters of each module, and a bypass circuit capable of shunt charge around the associated module when activated. The power management apparatus further includes a plurality of module management apparatuses (MMAs). Each module management apparatus interconnects with a plurality of unit management apparatuses by means of either wireless or wired communication circuits. The module management apparatus includes a computer, a power module responsive of distributing the charge currents to each said unit, a power condition circuit connected across two terminals between the MMA and the CMA responsive to regulating the operating voltage of the associated module, a power condition circuit connected across of unit management apparatuses' terminals for providing a regulated operating voltages of units within the same module, a plurality of measurement circuits to monitoring a plurality of state parameters of each units, a bypass circuit capable of shunt charge around the associated units when activated.

The power management apparatus additionally includes a plurality of units management apparatuses (UMAs). Each unit management apparatus is wired connected with or deposited on a unit. The unit management apparatus includes a microcomputer, measurement circuits to monitoring a plurality of state parameters, and a power condition circuit connected across two terminals between one of the MMAs and the UMA responsible of regulating the operating voltage of the associated unit. Furthermore, the power management apparatus includes a rechargeable battery power source for a central management apparatus, a plurality of module management apparatuses, and a plurality of unit management apparatuses.

Numerous benefits are achieved by way of the present invention over conventional techniques. For example, embodiments of the present invention provide methods for controlling hybridized energy devices. Depending upon the embodiment, one or more of these benefits may be achieved. These and other benefits will be described in more detail throughout the present specification and more particularly below.

These and other objects and features of the present invention and the manner of obtaining them will become apparent to those skilled in the art, and the invention itself will be best understood by reference to the following detailed description read in conjunction with the accompanying drawings.

DETAILED DESCRIPTION OF SPECIFIC EMBODIMENTS

EXAMPLE 1

A Control Scheme for a Hybridized Energy Device

Figure 1:
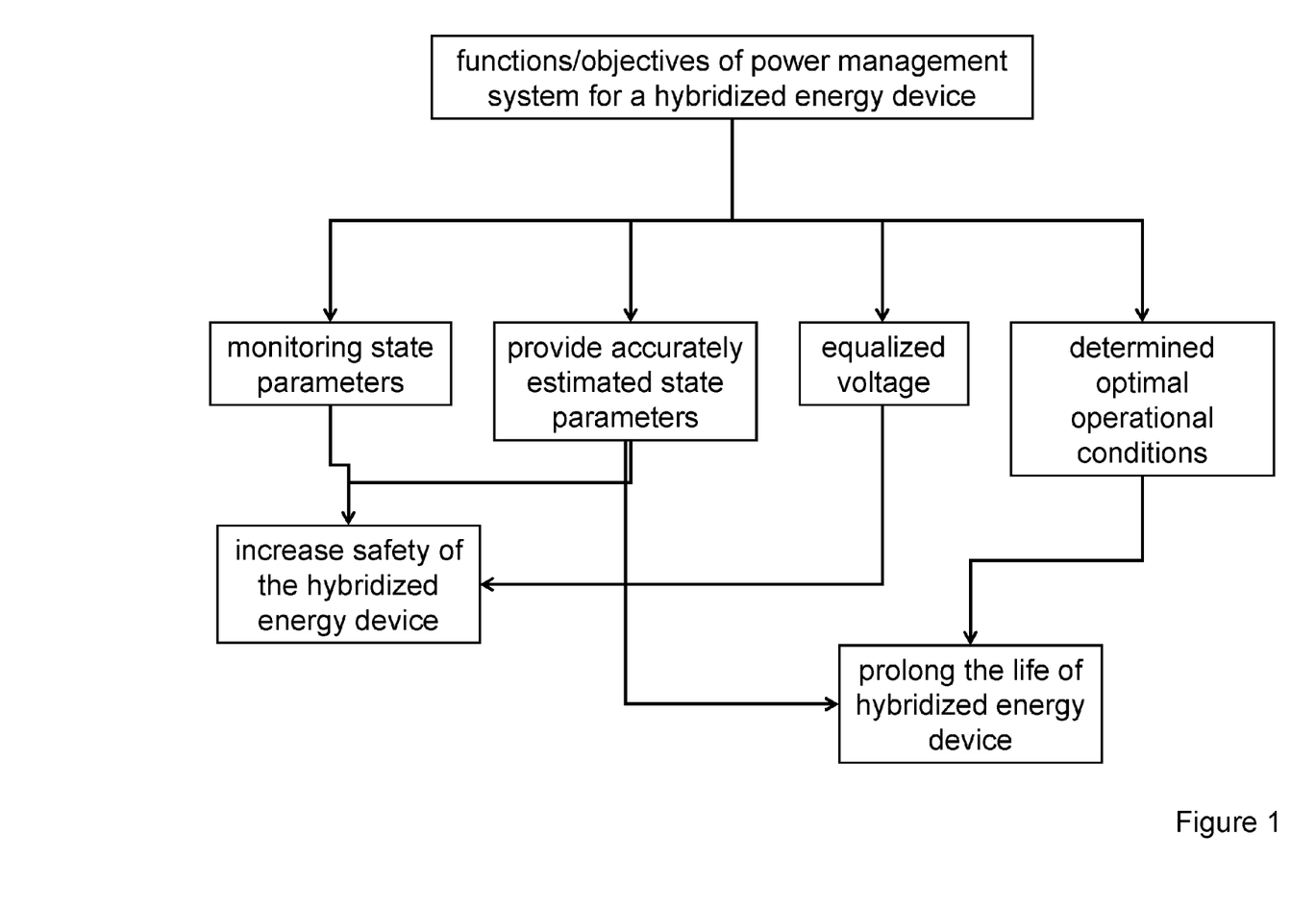
FIG. 1 is a simplified diagram illustrating functions/objectives of a power management system for a hybridized energy device according to an embodiment of the present invention.
Figure 2:
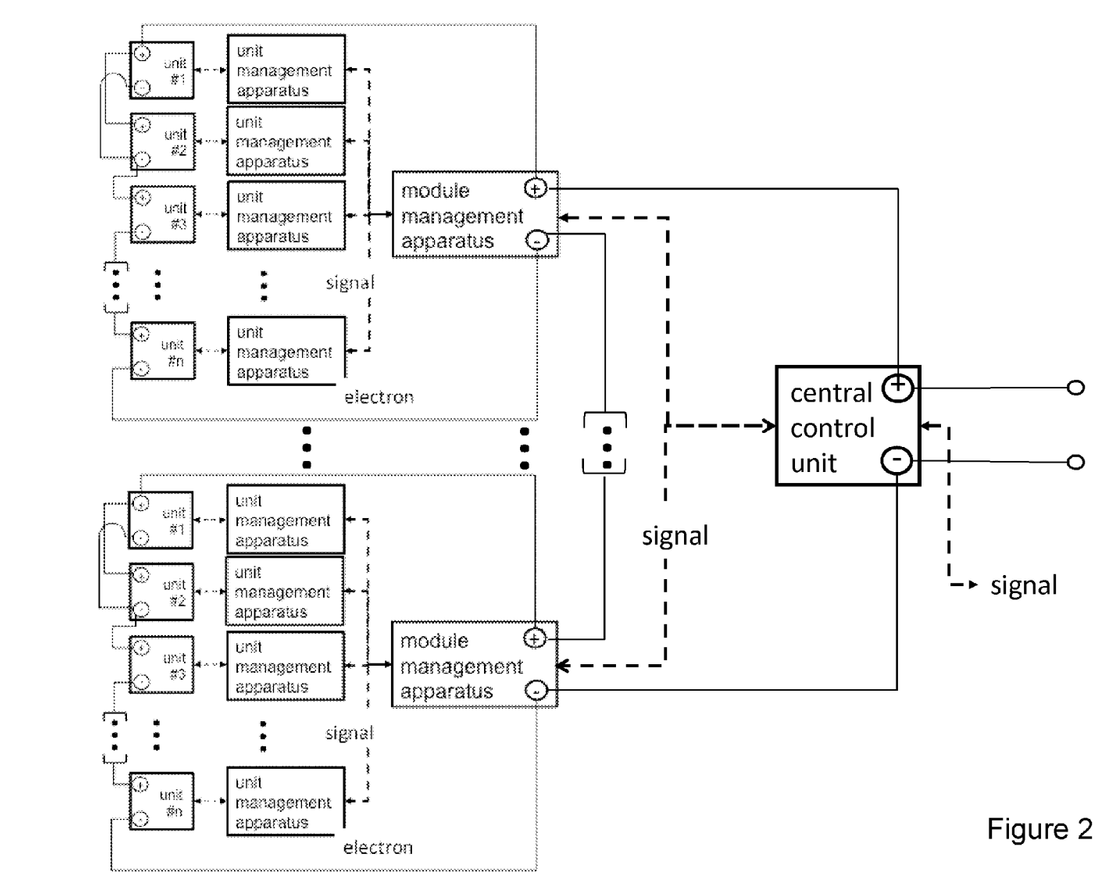
FIG. 2 is a simplified schematic diagram of a power management apparatus for a hybridized energy device according to an embodiment of the present invention.
Figure 3:
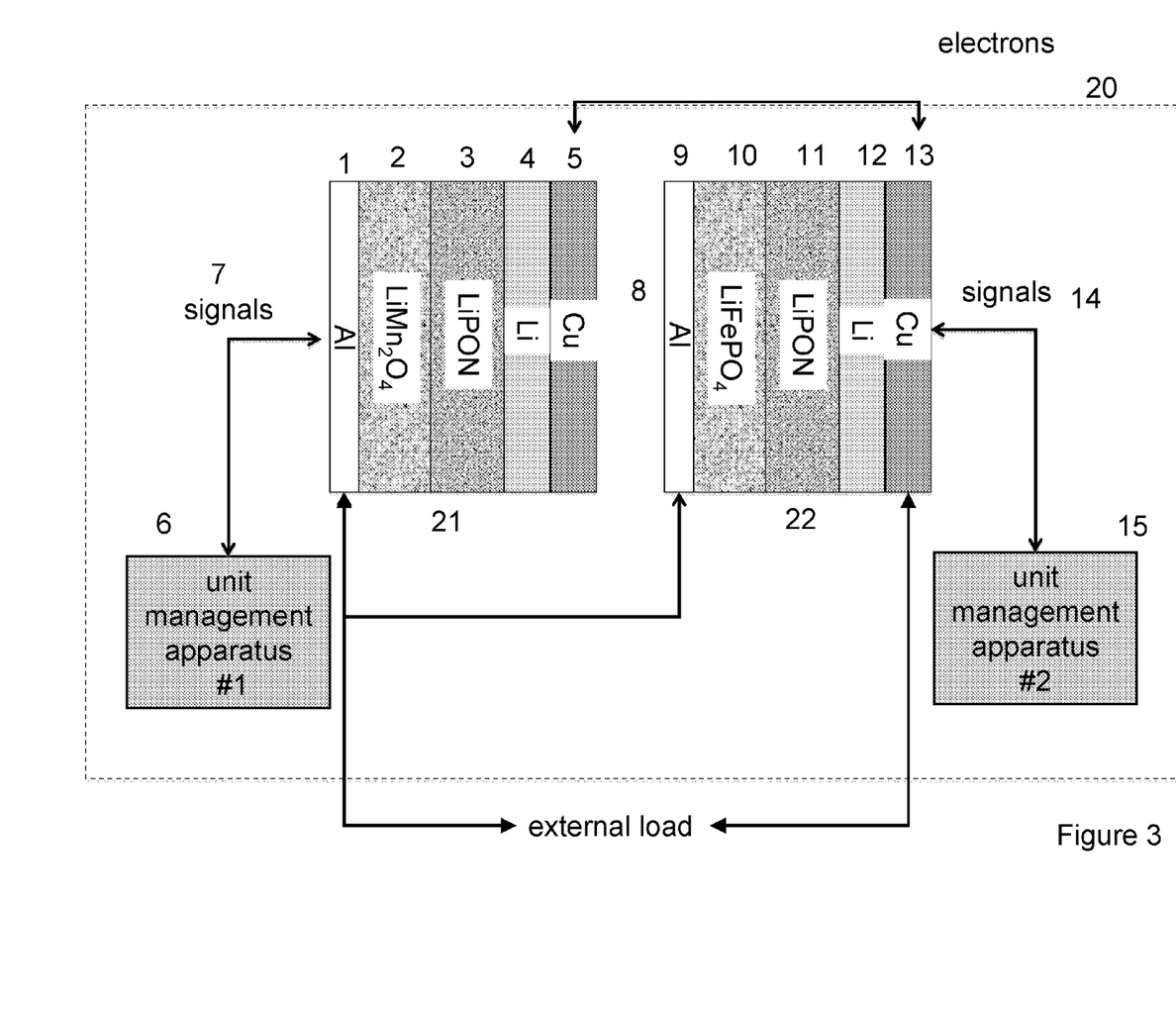
FIG. 3 is a simplified setup of a control scheme for a hybridized energy device according to an embodiment of the present invention.

This example demonstrates a setup of control scheme (20 in FIG. 3) for an hybridized energy device, wherein the hybridized energy device comprises $Li_xMn_2O_4$/LiPON/Li (21 in FIG. 3) and $Li_xFePO_4$/LiPON/Li (22 in FIG. 3) cells in parallel connection, and x is between 0 to 2 for $LiMn_2O_4$, and is between 0 and 1 for Li$_x$FePO$_4$. The unit management apparatus chips of #1 (6 in FIG. 3) and #2 (15 in FIG. 3) are deposited on Li$_x$Mn$_2$O$_4$/LiPON/Li (21 in FIG. 3) and Li$_x$FePO$_4$/LiPON/Li (22 in FIG. 3) cells. Because of the different voltage and current performance characteristics of LiMn$_2$O$_4$/LiPON/Li (21 in FIG. 3) and Li$_x$FePO$_4$/LiPON/Li (22 in FIG. 3) cells, the unit management apparatuses of #1 and #2 have accordingly different control signals for these two cells. For example, the open-circuit potential of the two cells are different: 4.2V for Li$_x$Mn$_2$O$_4$ (vs. Li) as x started from 0.2, and 3.5V for Li$_x$FePO$_4$ (vs. Li) as x started from 0.2. Furthermore, the open-circuit potential of the Li$_x$Mn$_2$O$_4$ (vs. Li) presents three plateaus at 4.2, 3.9, and 2.95V as x increases from 0.2 to 2, but it only presents one plateau at 3.5V for Li$_x$FePO$_4$ (vs. Li). Therefore it would be required to discharge Li$_x$Mn$_2$O$_4$/LiPON/Li to 3.5V before it could be setup in parallel. The higher voltage for Li$_x$Mn$_2$O$_4$/LiPON/Li in (0.2≦x≦1) would be very harmful to Li$_x$FePO$_4$/LiPON/Li cell.

EXAMPLE 2

A Control Scheme for a Hybridized Energy Device

Figure 4:
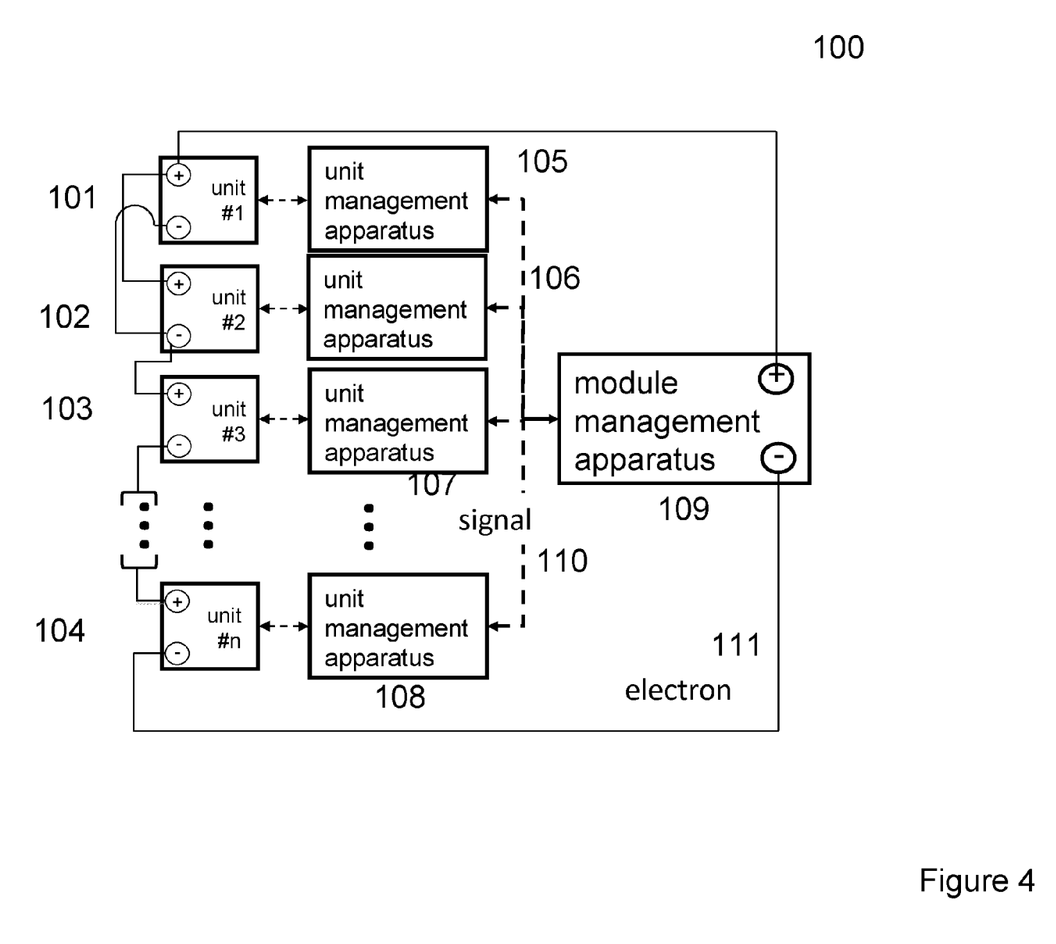
FIG. 4 is a simplified setup of a control scheme for a hybridized energy device including one module according to an embodiment of the present invention.
Figure 5:
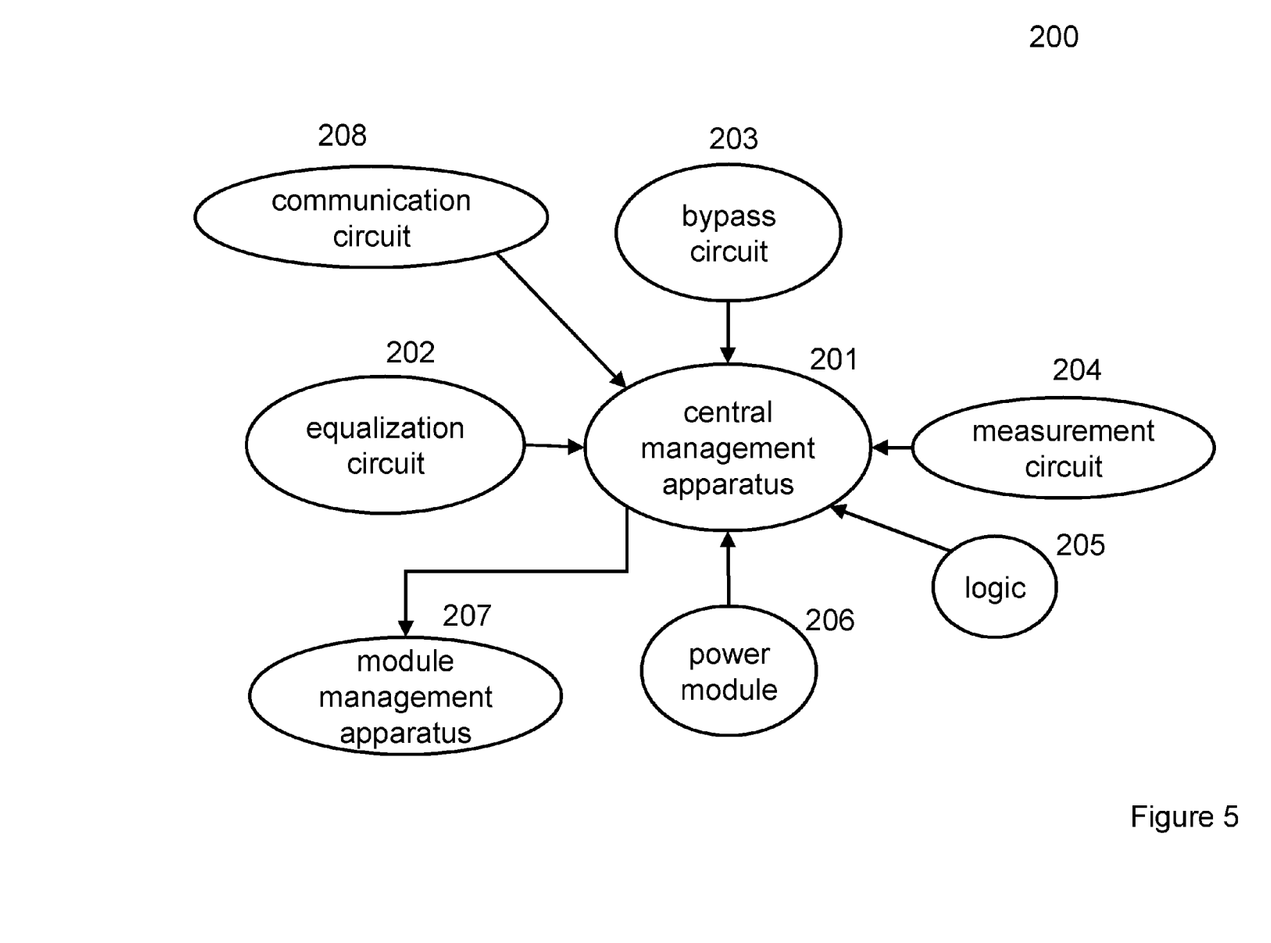
FIG. 5 is a simplified diagram of elements of a power management apparatus for a hybridized energy device including a central management apparatus according to an embodiment of the present invention.
Figure 6:
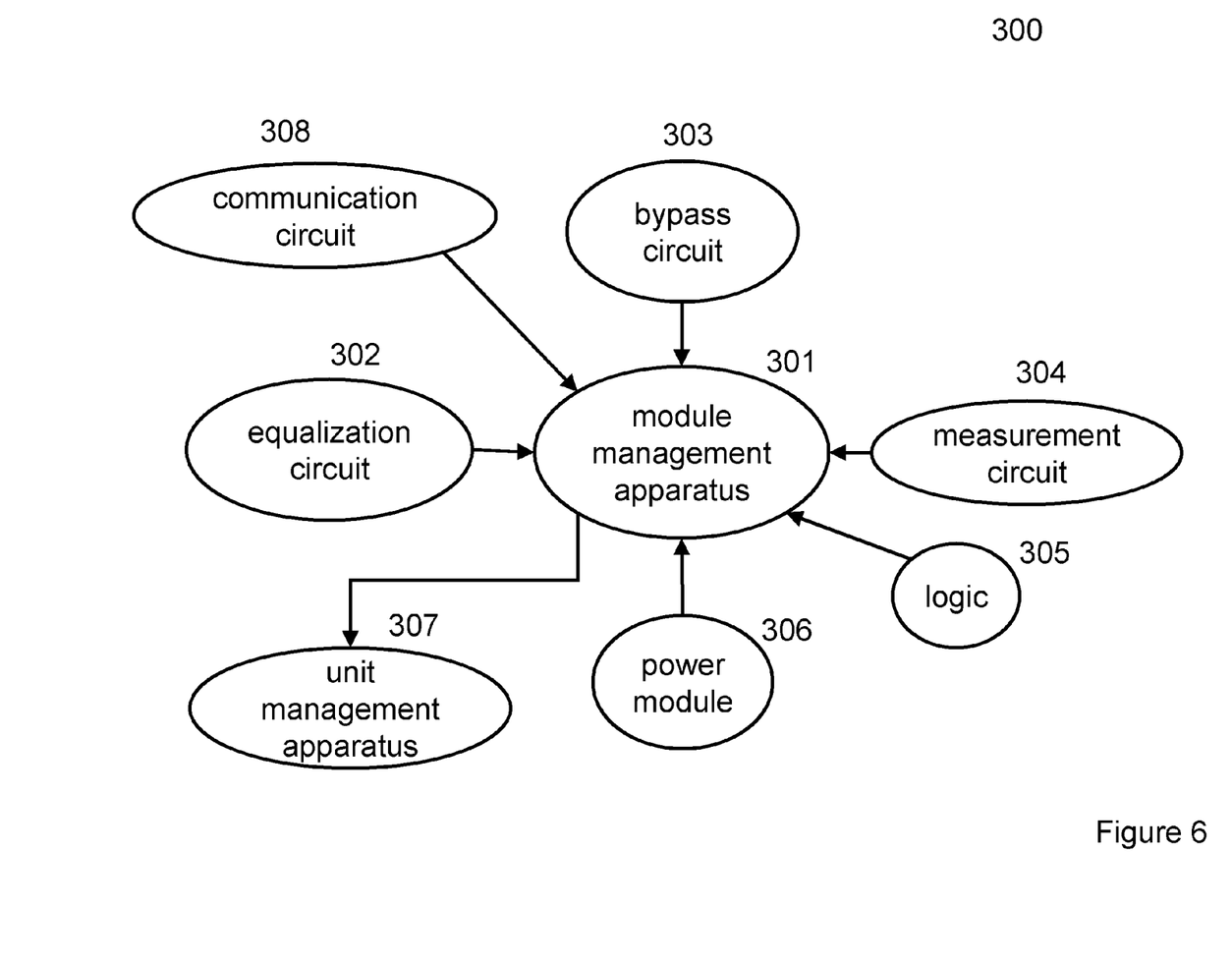
FIG. 6 is a simplified diagram of elements of a power management apparatus for a hybridized energy device including a module management apparatus according to an embodiment of the present invention.
Figure 6A:
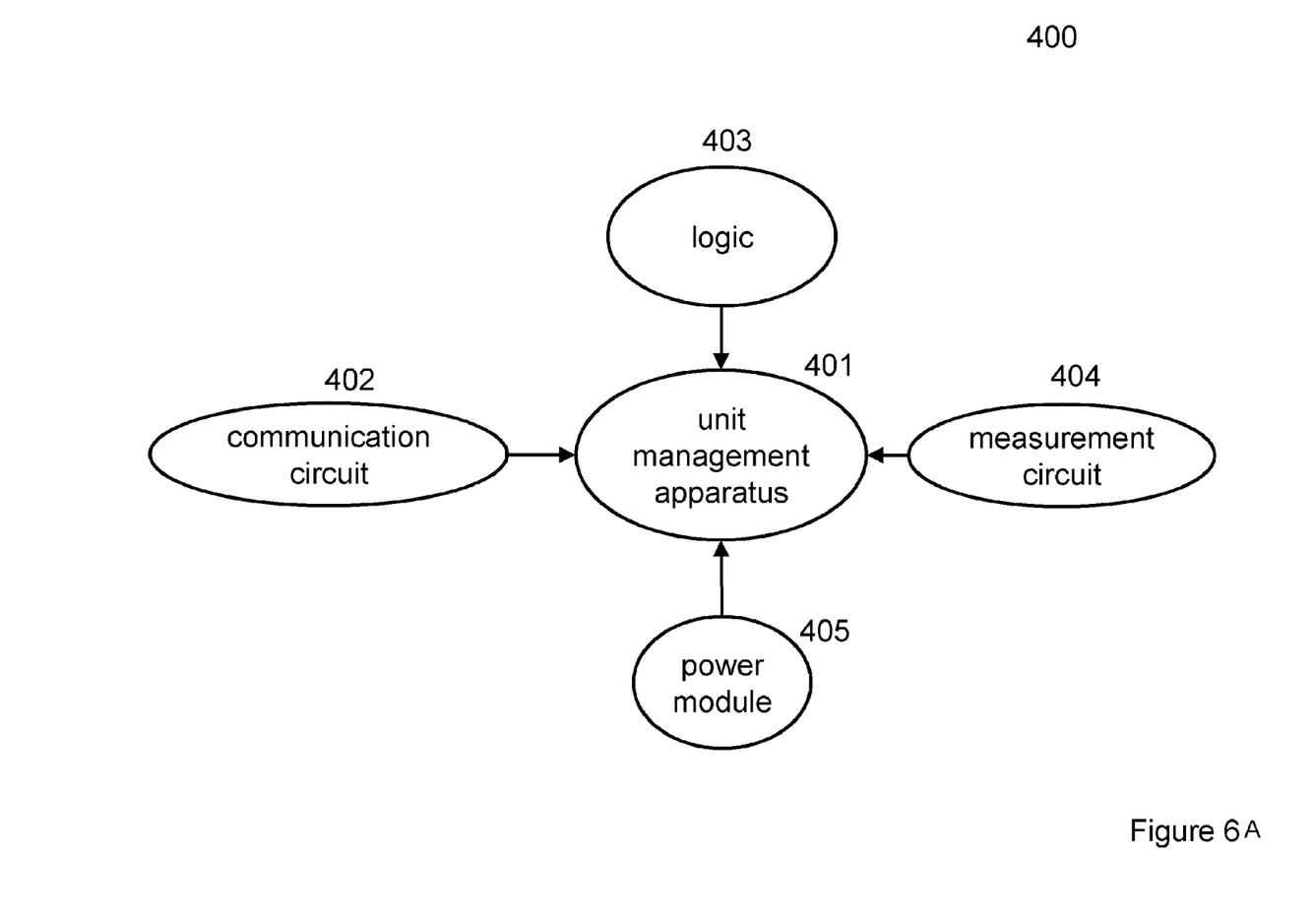
FIG. 6A is a simplified diagram of elements of a power management apparatus for a hybridized energy device including a unit management apparatus according to an embodiment of the present invention.
Figure 7:
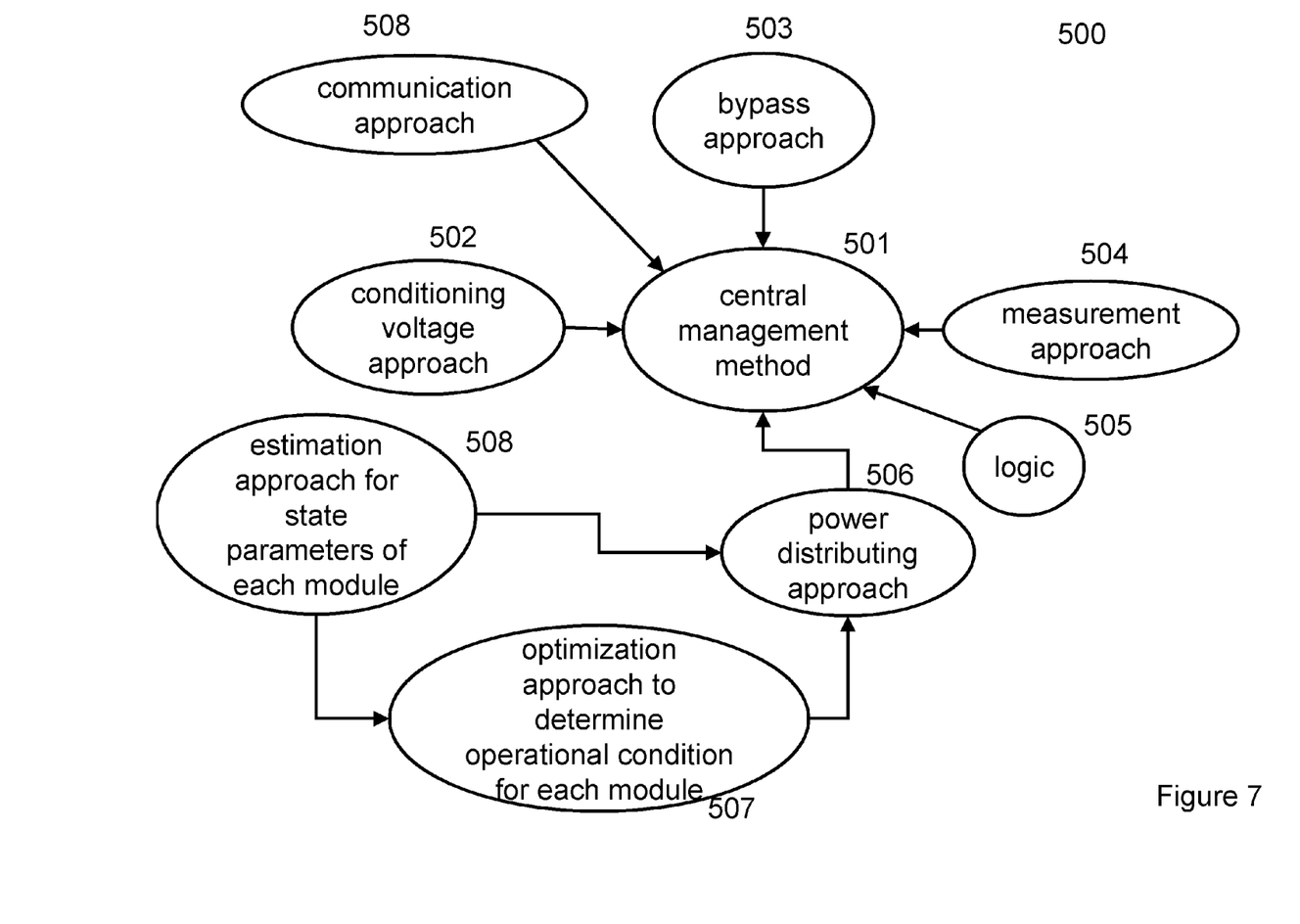
FIG. 7 is a simplified diagram illustrating approaches for a power management method for a hybridized energy device including a central management method according to an embodiment of the present invention.
Figure 8:
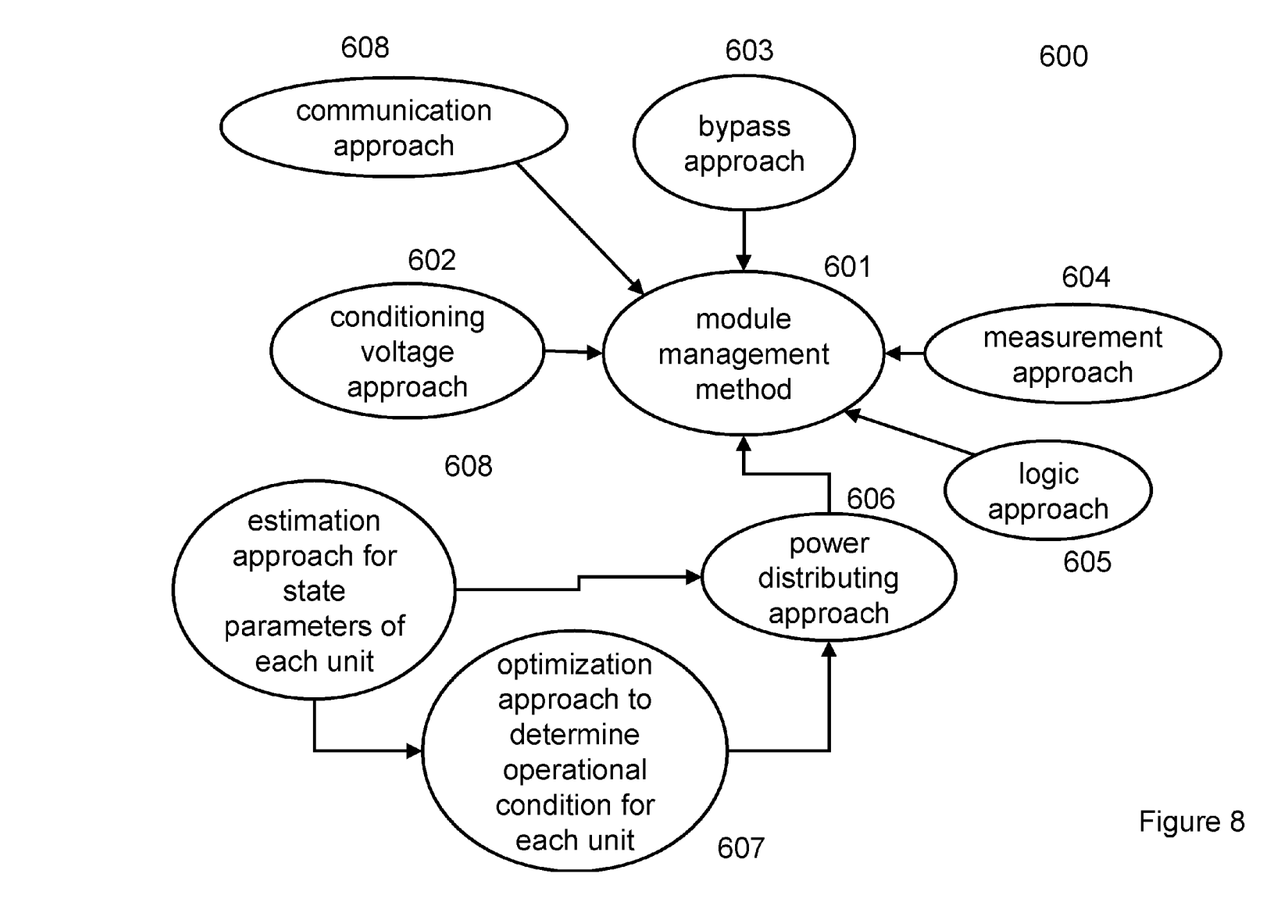
FIG. 8 is simplified diagram illustrating approaches for a power management method for a hybridized energy device including a module management method according to an embodiment of the present invention.
Figure 9:
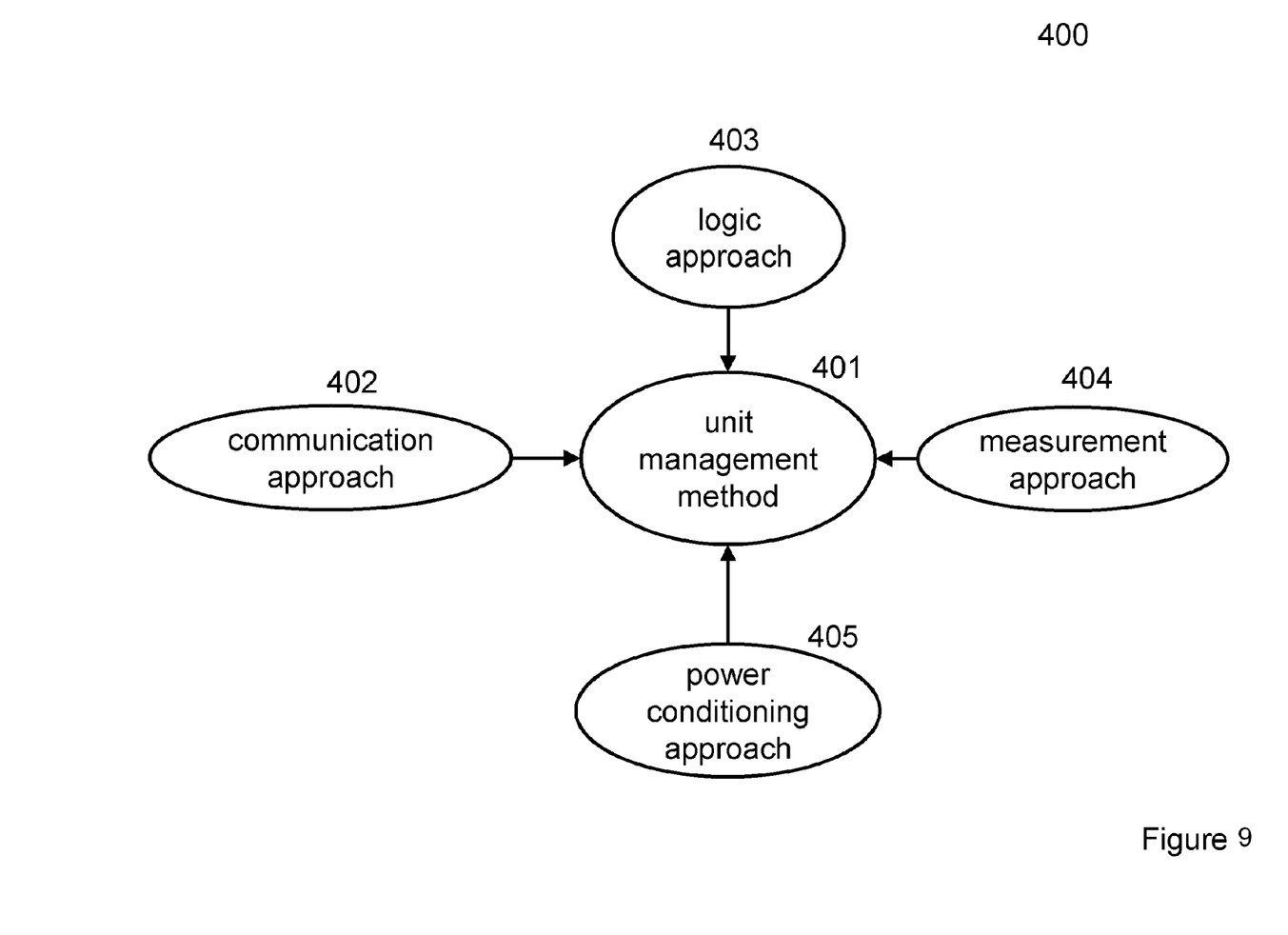
FIG. 9 is simplified diagram illustrating approaches for a power management method for a hybridized energy device including a unit management method according to an embodiment of the present invention.

This example demonstrates a setup of control scheme (100 in FIG. 4) for a hybridized energy device, wherein the hybridized energy device comprises one module. The said module comprises n units (as indicated 101 to 104 in FIG. 4). Each unit could be comprised of lithium ion cells, NiMH cells, fuel cells, capacitors, or combinations of those different energy storage/conversion devices. Each unit has one management apparatus deposited on it or connected with it. For illustration purpose, it could be assumed that unit #1 (101 in FIG. 4) is Li$_x$FePO$_4$/LiPON/Li cell, unit #2 (102 in FIG. 4) is capacitor, unit #3 (103 in FIG. 4) is a fuel cell. In this example, the unit #1 and unit #2 is connected in parallel, and unit #3 is series connected with unit #2. Hence, module management apparatus (109 in FIG. 4) has to send signal to unit management apparatuses #1 and #2 (105 and 106 in FIG. 4, respectively) to boost or lower the voltage of unit #1 cell (101 in FIG. 4) and unit #2 capacitor (102 in FIG. 4) all the time to equalize the voltage of both devices. Otherwise, the capacitor and Li$_x$FePO$_4$/LiPON/Li could charge or discharge each other depending on the potential of both devices. In order to prolong the life of the hybridized energy device (100 in FIG. 4), the module management apparatus has to monitor the state parameters, such as the state of charge, voltage, and temperatures, etc. Furthermore, it has to identify how to distribute the discharge or charge current to each unit so that the entire energy storages/conversion devices would have the best performance. To do that, it would require optimization techniques with multiple objective functions for each device. Because these three energy storage/conversion devices are different, the objective functions for each device would be different. Since it is multi-objective functions, it might not have only one optimal operating condition but a set of them. Therefore, it would require testing all possible conditions to reach so called Pareto optimal condition. For example, the state of charge and the variation of the state of charge for Li$_x$FePO$_4$/LiPON/Li, unit #1 (101 in FIG. 4) are both very important. However, fuel consumption, current variation and efficiency are important for fuel cell, unit #3 (103 in FIG. 4). The charged coulomb and efficiency are important for a capacitor, unit #2 (102 in FIG. 4). Therefore overall, the objective functions set for this hybridized energy device has to be constructed. To do so, the evolutionary multi-object optimization scheme will be employed to identify the optimal operating condition for each unit. Other constraints and operable ranges of each device would be employed to assist to identify the possible optimal conditions.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A power management apparatus for a hybridized energy device comprising:
    a hybridized energy device comprising a pack, the pack including a plurality of modules, the modules including a plurality of units configured in series or parallel, wherein the units include electrical energy storage or gathering cells;
    a central management apparatus (CMA) interconnecting a plurality of module management apparatus (MMAs) by means of either wired or wireless connections, the CMA including
        a microcomputer including a central processing unit (CPU) and a non-transitory computer readable medium, the non-transitory computer readable medium including one or more codes directed to
            communicating with each individual module by wired or wireless connections,
            conditioning voltages across the connected modules,
            monitoring one or more first state parameters of each module,
            estimating one or more first and second state parameters of each module at a first and at a second predetermined time,
            determining the operational conditions of one or more first state parameters for the associated module having an optimal second state parameters of the hybridized energy device,
            shunting excess charge around the associated module,
            communicating among connected MMAs,
            monitoring one or more first state parameters of modules when the hybridized energy device is in idle, and
            conditioning the connected modules when the hybridized energy device is in idle,
        a power module responsive of distributing the charging currents to each of said modules,
        a power condition circuit connected across terminals of the MMAs and the CMA for providing regulated operating voltages of modules of the associated pack,
        a plurality of measurement circuits to monitor a plurality of state parameters of each module, and
        a bypass circuit configured to shunt charge around the associated module when activated,
    wherein each of the plurality of MMAs, interconnects with a plurality of unit management apparatuses (UMAs) by means of wireless or wired communication circuits, each of the MMAs comprising
        a microcomputer including a CPU and a non-transitory computer readable medium, the non-transitory computer readable medium including one or more codes directed to
            communicating with each connected UMA and CMA by wired or wireless connections,
            conditioning voltages across the connected units,
            monitoring one or more first state parameters of each unit, estimating one or more first and second state parameters of each unit at a first and at a second predetermined time,
determining the operational conditions of one or more first state parameters for the associated unit having an optimal second state parameters of the module,
shunting excess charge around the associated unit,
monitoring one or more first state parameters of the unit when the associated module is in idle, and
conditioning the connected unit when the associated module is in idle,
a power module responsive of distributing the charge currents to each said unit,
a power condition circuit connected across two terminals between the MMAs and the CMA responsive to regulating the operating voltage of the associated module,
a power condition circuit connected across of the terminals of the UMAs for providing a regulated operating voltages of units within the same module,
a plurality of measurement circuits to monitoring a plurality of state parameters of each units,
a bypass circuit configured to shunt charge around the associated units when activated,
wherein each of the plurality of UMAs is wire-connected with or is deposited on a unit, each UMA including
a microcomputer including a CPU and a non-transitory computer readable medium, the non-transitory computer readable medium including one or more codes directed to
communicating between the UMA and MMA by wired or wireless connections,
communicating between two UMAs by wired-connection or being deposited on a unit,
changing the operating voltage of the associated unit,
monitoring a plurality of one or more first state parameters,
estimating one or more first and second state parameters at a first and at a second predetermined time, and
calculating the second state parameters based on looking up tabulated data of said first state parameters,
measurement circuits to monitoring a plurality of state parameters, and
a power condition circuit connected across two terminals between one of the MMAs and the UMA responsible of regulating the operating voltage of the associated unit; and
a rechargeable battery power source for the CMA the plurality of MMAs, and the plurality of UMAs.

2. The device of claim 1 wherein the energy storage or gathering cells comprise any combination of rechargeable electrochemical cells and primary electrochemical cells.

3. The device of claim 2 wherein the rechargeable electrochemical cells comprise lithium-ion cells, nickel metal hydride cells, nickel cadmium cells, lead-acid cells, nickel zinc cells, or lithium sulfur cells.

4. The device of claim 2 wherein the primary electrochemical cells comprise zinc-carbon cells, magnesium and aluminum cells, alkaline-manganese dioxide cells, silver oxide cells, zinc-air cells, lithium cells, or alkaline cells.

5. The device of claim 1 wherein the energy storage or gathering cells comprise any combination of fuel cells, capacitors, or solar cells.

6. The device of claim 5 wherein the fuel cells comprise polymer exchange membrane fuel cells, solid oxide fuel cells, alkaline fuel cell, molten-carbonate fuel cell, phosphoric-acid fuel cell, or direct-methanol fuel cell.

7. The device of claim 5 wherein the solar cells comprise amorphous solar cells, mono crystalline solar cells, or multi-crystalline solar cells.

8. The device of claim 5 wherein the capacitor cells comprise dielectric spacers, solid dielectrics, electrolytic capacitors, or supercapacitors.

9. A power management method for a hybridized energy device comprising:
providing a hybridized energy device including
a pack including a plurality of modules, the modules including a plurality of units configured in series or parallel, wherein the units include electrical energy storage or gathering cells,
a central management apparatus (CMA) interconnecting a plurality of module management apparatus (MMAs) by means of either wired or wireless connections, the CMA including
a microcomputer,
a power module responsive of distributing the charging currents to each of said modules,
a power condition circuit connected across terminals of the MMAs and the CMA for providing regulated operating voltages of modules of the associated pack,
a plurality of measurement circuits to monitor a plurality of state parameters of each module, and
a bypass circuit configured shunt charge around the associated module when activated,
wherein each of the plurality of MMAs, interconnects with a plurality of unit management apparatuses (UMAs) by means of wireless or wired communication circuits, each of the MMAs comprising
a microcomputer,
a power module responsive of distributing the charge currents to each said unit,
a power condition circuit connected across two terminals between the MMAs and the CMA responsive to regulating the operating voltage of the associated module,
a power condition circuit connected across of the terminals of the UMAs for providing a regulated operating voltages of units within the same module,
a plurality of measurement circuits to monitoring a plurality of state parameters of each units, and
a bypass circuit configured to shunt charge around the associated units when activated,
wherein each of the plurality of UMAs is wire-connected with or is deposited on a unit, each UMA including
a microcomputer including a non-transitory computer readable medium
measurement circuits to monitoring a plurality of state parameters, and
a power condition circuit connected across two terminals between one of the MMAs and the UMA responsible of regulating the operating voltage of the associated unit, and
a rechargeable battery power source for the CMA, the plurality of MMAs, and the plurality of UMAs;
a central management method (CMM) including
communicating with each individual module by means of either wired or wireless connections,
conditioning voltages across the connected modules, approaches of monitoring one or more first state parameters of each modules, estimating one or more first and second state parameters of each modules at a first and at a second predetermined times, determining the operational conditions of one or more first state parameters for the associated module having an optimal second state parameters of the hybridized energy device, shunting excess charge around the associated module, communicating among connected MMAs, monitoring one or more first state parameters of modules when the hybridized energy device is in idle, and conditioning the connected modules when the hybridized energy device is in idle;

a plurality of module management methods (MMMs), wherein each module management method includes communicating via a wired or wireless circuit with each connected UMA and CMA, conditioning voltages across the connected units, monitoring one or more first state parameters of each units, estimating one or more first state parameters at a first and a second predetermined time, determining the operational conditions of one or more first state parameters for the associated unit having an optimal second state parameters of the module, shunting excess charge around the associated unit, monitoring one or more one or more a first state parameters of unit when the associated module is in idle mode, and conditioning the connected unit when the associated module is in idle mode;

a plurality of unit management methods (UMMs), wherein each unit management method includes communicating between the UMA and MMA of, communicating between two UMAs by wired connected with or deposited on a unit, changing the operating voltage of the associated unit, monitoring a plurality of one or more first state parameters, estimating one or more first state parameters at a first and at a second predetermined time, and calculating the second state parameters based on looking up tabulated data of said first state parameters; and regulating the energy of the battery power source to achieve maximum operational period.

10. The method of claim 9 wherein the first state parameters comprise state of charge (SOC), temperature, voltage, resistance, and discharge or charge current.

11. The method of claim 9 wherein the second state parameters comprises to lifetime, safety, mechanical, kinetic, thermal, ion concentration, voltage profile, degree of intercalation, degree of achievable capacity under various discharge rate or discharge profile, intercalation-induced stresses, volume changes, capacity loss, efficiency, and power status.

12. The method of claim 9 wherein each of the microcomputers for any of the CMA, MMAs, and UMAs comprises a central processing unit (CPU), input and output terminals responsible of accepting and delivering management commands from and to connected terminals, input and output circuitry for series connection of bypass modules and units, stored computer programs into storage system for calculating the second state parameters by either looking up and extrapolating the stored data table of said first state parameters of the module or unit or using a physics based mathematical model for the said cells or calculated by mathematical models, computer programs responsive estimating said first state parameters at the next predetermined time, computer algorithms for calculating the operational conditions for each module or unit, memory to store said state variables and processed data, and an operational amplifiers and capacitors to balance the mismatch cell voltages among parallel cells within the module.

13. The device of claim 1 wherein the measurement circuits of CMA, MMA, and UMA include a plurality of metering circuits to measure electrical and thermodynamic state variables, and a plurality of circuits isolating each module/unit to avoid the effect of connecting modules and units to achieve high accuracy.

14. The method of claim 9 wherein the conditioning of voltages across the connected modules of the CMM comprises discharging the high voltage module or charging the low voltage module, wherein the connected modules are in series.

15. The device of claim 1 wherein the power management apparatus of claim 1 wherein the CMA, MMAs, and UMAs include counter circuits for activating the next sampling.

16. The method of claim 9 wherein the hybridized energy device includes one or more central processing units (CPU) and one or more non-transitory computer readable mediums, wherein the estimating of one or more first and one or more second state parameters of said unit at a first and a second predetermined time comprises:

one or more computer codes provided in the non-transitory computer readable mediums for processing information related to a three-dimensional electrochemical system comprising an anode, cathode, separator, electrolyte, and current collectors obtained from the measuring circuit, and obtained from the mathematical model at a first predetermined time;

one or more computer codes provided in the non-transitory computer readable mediums for processing information related to a three-dimensional fuel cell comprising one or more electrodes, electrolyte, and catalyst obtained from the measuring circuit, and obtained from the mathematical model at a first predetermined time;

one or more computer codes provided in the non-transitory computer readable mediums for processing information related to a three-dimensional solar cell comprising a negative terminal, a n-type semiconductor layer, a p-n junction, a p-type semiconductor layer, and a positive terminal obtained from the measuring circuit, and obtained from the mathematical model at a first predetermined time;

one or more computer codes provided in the non-transitory computer readable mediums for processing information related to a three-dimensional capacitor comprising two electrodes, and a dielectric layer obtained from the measuring circuit, and obtained from the mathematical model at a first predetermined time;

one or more computer codes provided in the non-transitory computer readable mediums for outputting a computer generated relationship between one or more first material characteristics referenced against one or more second material characteristics for a selected material set for a design of three dimensional spatial elements in a three-dimensional said electrochemical cell, said fuel cell, said solar cell, or said capacitor cell;

one or more codes provided in the non-transitory computer readable mediums directed to selecting one or more of the first material characteristics or second material characteristics for the selected material set;

one or more codes provided in the non-transitory computer readable mediums directed to executing a modeling program for processing the one or more first material characteristics or second material characteristics to provide the three dimensional said electrochemical cell, said fuel cell, said solar cell, or said capacitor cells having a three-dimensional geometries at a second predetermined time; and one or more codes provided in the non-transitory computer readable mediums directed to processing the one or more selected first or second material characteristics to determine whether the one or more first or second material characteristics is within one or more operable range of second state parameters.

17. The method of claim 16 wherein the one or more first material characteristics comprises electrical, thermal, mechanical, transport, or kinetic.

18. The method of claim 16 wherein the one or more second material characteristics comprises particle size, particle spacing, volume fraction, density, composition of cathode, composition of anode, composition of separator, composition of current collector, composition of electrolyte, dimensions of cathode, dimensions of anode, dimensions of separator, dimensions of current collectors, dimensions of electrolyte, interfacial interaction of electrolyte and anode or electrolyte and cathode, shape of the cathode, shape of anode, shape of separator, shape of electrolyte, and the types of materials.

19. The method of claim 16 wherein the modeling program comprises 3D finite element model, I D finite element model, I D finite difference model, an equivalent circuit model, a cell model coupled with evolution model, or a lookup data table.

20. The method of claim 16 wherein the selected material sets comprises of composition materials for anode, cathode, separator, electrolyte, current collectors, dielectric material, p-type material, n-type material, p-n junction, and catalyst.

21. The method of claim 16 further comprising:
one or more codes provided in the non-transitory computer readable mediums directed to a meshing program; and
one or more codes provided in the non-transitory computer readable mediums directed to setting up one or more boundary conditions.

22. The method of claim 19 wherein the lookup data table is constructed externally from the hybridized energy device with any said cell models and imported to the data storage device of said UMA, is comprised of an historical table of one or more first and one or more second state parameters.

23. The method of claim 16 wherein the estimating one or more second state parameters of said module at a first and at a second predetermined time of the MMM comprises:
one or more computer codes provided in the non-transitory computer readable mediums for processing information obtained from the three-dimensional electrochemical system, the three-dimensional fuel cell, the three-dimensional solar cell, and the three-dimensional capacitor and obtained from the measurement circuits of the plurality of units at a first predetermined time, wherein said module comprises of a plurality of electrochemical cells, solar cells, fuel cells, and capacitor cells connected in series or in parallel;
one or more computer codes provided in the non-transitory computer readable mediums for outputting a computer generated relationship between one or more first state parameters referenced against one or more second state parameters for a said module;
one or more codes provided in the non-transitory computer readable mediums directed to executing a modeling program for processing the one or more first state parameters or second state parameters to provide the three dimensional module consisting of a plurality of electrochemical cells, solar cells, fuel cells, and capacitor cells connected in series or in parallel at a second predetermined time; and
one or more codes provided in the non-transitory computer readable mediums directed to processing the one or more selected first or second state parameters of a plurality of units to determine whether the one or more first or second state parameters of said module is within one or more operable range of second state parameters at a second predetermined time.

24. The method of claim 23 wherein the modeling program comprises an ID finite difference model, an equivalent circuit model, or a module model coupled with evolution model.

25. The method of claim 23 wherein the estimating of one or more a second state parameters of said pack at a first and at a second predetermined time of the CMM comprises:
one or more computer codes provided in the non-transitory computer readable mediums for processing information from the one or more selected first or second state parameters of a plurality of units of the MMM and from the measurement circuit of a plurality of modules at a first predetermined time, wherein said pack comprises of a plurality of modules connected in series or in parallel;
one or more computer codes provided in the non-transitory computer readable mediums for outputting a computer generated relationship between one or more first state parameters referenced against one or more second state parameters for a said pack;
one or more codes provided in the non-transitory computer readable mediums directed to executing a modeling program for processing the one or more first state parameters or second state parameters to provide the pack consisting of a plurality of modules connected in series or in parallel to a second predetermined time; and
one or more codes provided in the non-transitory computer readable mediums directed to processing the one or more selected first or second state parameters of a plurality of modules to determine whether the one or more first or second state parameters of said pack is within one or more operable range of the second state parameters at a second predetermined time.

26. The method of claim 25 wherein the modeling program comprises to ID finite difference model, an equivalent circuit model, or a pack model coupled with evolution model.

27. The method of claim 9 wherein determining the operational conditions for each modules of the CMM comprises:
one or more computer codes provided in the non-transitory computer readable mediums for processing external information related to a required power consumption converted from the external load between the first and second predetermined times;
one or more computer codes provided in the non-transitory computer readable mediums for generating operable range for one or more first state parameters each modules within the pack between a first and a second predetermined times;
one or more computer codes provided in the non-transitory computer readable mediums for determining a plurality of sampling times between a first and a second predetermined times;
one or more computer codes provided in the non-transitory computer readable mediums for determining a plurality of one or more of a first and a second state parameters, estimated at a plurality of sampling instants in time based on a plurality of one or more of first state parameters of each module estimated at a first predetermined instant in time;

one or more computer codes provided in the non-transitory computer readable mediums for creating objective functions based on an evolutionary multi-objective optimization scheme at various sampling times; and one or more codes provided in the non-transitory computer readable mediums directed to selecting one or more first state parameters until one or more of the first state parameters fulfilled at least one of the criteria listed bellowed for each module: minimization of said objective functions, fulfilled criteria of said operable range of one or more of a first state parameters of each modules, and fulfilled desired value of one or more of a second state parameters of each modules; and one or more codes directed to assign the selected one or more the first state parameters for each modules with the pack.

28. The method of claim 27 wherein an approach determining the operational conditions for each units of the MMM comprises:

one or more computer codes provided in the non-transitory computer readable mediums for processing information related to selected one or more of the first state parameters for the specified module;

one or more computer codes provided in the non-transitory computer readable mediums for generating operable range for one or more first state parameters for each units within a specified module between a first and a second predetermined times;

one or more computer codes provided in the non-transitory computer readable mediums for determining a plurality of sampling times between a first and a second predetermined times;

one or more computer codes provided in the non-transitory computer readable mediums for determining a plurality of one or more of a first and a second state parameters, estimated at a plurality of sampling instants in time based on a plurality of one or more of first state parameters of each module estimated at a first predetermined instant in time;

one or more computer codes provided in the non-transitory computer readable mediums for creating objective functions based on an evolutionary multi-objective optimization scheme at various sampling times;

one or more codes provided in the non-transitory computer readable mediums directed to selecting one or more first state parameters until one or more of the first state parameters fulfilled at least one of the criteria listed bellowed for each unit: minimization of said objective functions, fulfilled criteria of said operable range of one or more of a first state parameters of each unit, and fulfilled desired value of one or more of second state parameters of each unit; and one or more codes provided in the non-transitory computer readable mediums directed to assign the selected one or more first state parameters to each unit within the module.

29. The method of claim 28 wherein the evolutionary multi-objective optimization comprises aggregate functions, vector evaluated genetic algorithm, multi-objective genetic algorithm, nondominated sorting genetic algorithm, niched-Pareto genetic algorithm, target vector approaches, Pareto archived evolution strategy, strength Pareto evolutionary algorithm, or micro-genetic algorithm.

* * * * *